(12) United States Patent
Petro

(10) Patent No.: US 6,724,893 B1
(45) Date of Patent: Apr. 20, 2004

(54) METHOD OF PASSING A CRYPTOGRAPHIC KEY THAT ALLOWS THIRD PARTY ACCESS TO THE KEY

(75) Inventor: John Petro, Columbia, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 1739 days.

(21) Appl. No.: 08/722,385

(22) Filed: Oct. 11, 1996

(51) Int. Cl.[7] .............................................. H04K 1/00
(52) U.S. Cl. ........................................ 380/21; 380/23
(58) Field of Search ..................... 380/21, 23, 28–30, 380/285, 286

(56) References Cited

U.S. PATENT DOCUMENTS

| | | |
|---|---|---|
| 4,200,770 A | 4/1980 | Hellman et al. |
| 4,995,082 A | 2/1991 | Schnorr ........................ 380/23 |
| 5,231,668 A | 7/1993 | Kravitz ........................ 380/28 |

OTHER PUBLICATIONS

FIPS Pub 186, Digital Signature Standard, May 19, 1994.
Horster et al., "META–Elgamal Signature Schemes," May 31, 1994, ACM.
Nyberg et al., "Message Recovery for Signature Schemes Based on the DLP," Apr. 8, 1994, Eurocrypt '94.
Schnorr, "Efficient Identification and Signatures for Smart Cards".
Elgamal, "A Public Key Cryptosystem and a Signature Scheme Based on Discrete Logarithms".

*Primary Examiner*—Stephen C. Buczinski
(74) *Attorney, Agent, or Firm*—Robert D. Morelli

(57) ABSTRACT

A method of passing a cryptographic key that allows recovery of the key by a third party by generating a first random number by a first user; generating "$key_1$" by the first user; generating a second random number "$k_{2a}$" by the first user; computing "$y_1$" by the first user; computing "$y_2$" by the first user; computing "$r_1$" by the first user; computing "z" by the first user; computing "s" by the first user; computing "G" by the first user; passing ($G,z,r_1,s$) from the first user to the second user; receiving "Y" by the second user; computing "T" by the second user; computing "$y_1$" by the second user; computing "$k_{1a}$" by the second user; computing "$key_1$" by the second user; intercepting, by a third party, ($G,z,r_1,s$) transmitted from the first user to the second user; presenting "G" and "z," by the third party, to a key-escrow agent; computing "$y_2$" by the key-escrow agent; computing "$key_2$" by the key-escrow agent, where $key_2=key_1$; returning "key" from the key-escrow agent to the third party if the third party is authorized to receive "$key_2$"; and using "$key_2$" by the authorized third party, to decrypt an encrypted message sent between the first user and the second user which was encrypted using "$key_1$."

19 Claims, 3 Drawing Sheets

| A | B | C | SIGNATURE | VERIFICATION |
|---|---|---|---|---|
| $z$ | $r_1$ | $s$ | $s = (1/k_{1a})(k_{2a}z - x_a r_1) \bmod q$ | $T = (Y^{r_1} G^s)^{(1/z \bmod q)} \bmod p$ |
| $z$ | $s$ | $r_1$ | $s = (1/x_a)(k_{2a}z - k_{1a}r_1) \bmod q$ | $T = (Y^s G^{r_1})^{(1/z \bmod q)} \bmod p$ |
| $s$ | $r_1$ | $z$ | $s = (1/k_{2a})(x_a r_1 + k_{1a}z) \bmod q$ | $T = (Y^{r_1} G^z)^{(1/s \bmod q)} \bmod p$ |
| $s$ | $z$ | $r_1$ | $s = (1/k_{2a})(x_a z + k_{1a} r_1) \bmod q$ | $T = (Y^z G^{r_1})^{(1/s \bmod q)} \bmod p$ |
| $r_1$ | $s$ | $z$ | $s = (1/x_a)(k_{2a} r_1 - k_{1a} z) \bmod q$ | $T = (Y^s G^z)^{(1/r_1 \bmod q)} \bmod p$ |
| $r_1$ | $z$ | $s$ | $s = (1/k_{1a})(k_{2a} r_1 - x_a z) \bmod q$ | $T = (Y^z G^s)^{(1/r_1 \bmod q)} \bmod p$ |

FIG. 3

METHOD OF PASSING A CRYPTOGRAPHIC KEY THAT ALLOWS THIRD PARTY ACCESS TO THE KEY

FIELD OF THE INVENTION

This invention relates to cryptography and, more particularly, to a method of passing a cryptographic key so that an authorized third party may gain access to the key.

BACKGROUND OF THE INVENTION

Practitioners in the field of cryptography first occupied themselves with trying to find a mathematical function that an adversary could not determine. Theoretically, such functions exist (e.g., scramblers). However, such devices are not secure because such devices are easily reverse-engineered in order to determine the cryptographic function.

The notion that hardware could be kept secret was abandoned. An idea was then introduced to couple a secret random entity (i.e., a cryptographic key) to the hardware in order to keep communications secure even if the hardware was reverse engineered. In this scenario, each user received a copy of the hardware. Each pair, or group, of users who wished to communicate securely would decide on a cryptographic key. For convenience, the process was such that the cryptographic key could be used for both encryption and decryption hence the terms "symmetric-key" and "symmetric-key cryptography." The cryptographic key decided upon was then securely given to each party to the communication. Typically, this meant that the cryptographic key had to be securely delivered to each user. Such a key distribution system works well with a closed group of users consisting of a small number, but it becomes unwieldy when the number of users is large. Also, if the symmetric-key is compromised, the communications of everyone using the key is compromised. Therefore, a need arose for a solution to the key distribution problem. Public-key cryptography offers such a solution.

U.S. Pat. No. 4,200,770, entitled "CRYPTOGRAPHIC APPARATUS AND METHOD," is a patent on the first publicly disclosed method of arriving at a secret symmetric-key between two users using a non-secure channel. U.S. Pat. No. 4,200,770, commonly referred to as the Diffie-Hellman key exchange method, is hereby incorporated by reference into the specification of the present invention. In this key exchange method, each user generates a random number that is kept secret. Each user uses their secret as an exponent to a non-secret base that is shared in common with the other user (i.e., exponentiation). Each user modulo reduces their exponentiation by a non-secret number that is shared in common with the other user. Each user transmits their modulo reduced exponentiation to the other user. Each user raises the exponentiation they receive to their secret, and each user modulo reduces this second exponentiation by the same shared modulus. This results in each user computing the same value that is known only by them. In effect, each user conceals their secret (the exponent) in a mathematical function that is believed to be unsolvable for large values (i.e., modulo reduced exponentiation). Each user transmits their buried secret to the other user. Each user raises the other user's buried secret to their secret. After a final modulo reduction, each user is in possession of the same symmetric key that an adversary cannot mathematically determine. To mathematically determine the key, an adversary must be able to determine the discreet logarithm of what at least one user transmitted, hence the name "discreet logarithm problem." This problem is considered unsolvable, or intractable, for large values.

Here, "key exchange" is defined as each user participating in the creation of a key. Neither participant knows in advance what the final key will be. This differs from a "key pass" which entails a single user creating a key and passing it securely to the other user. The receiving user recovers, or decrypts, the key but does not alter the key in any other way.

Along with the advantages of public-key cryptography there are some disadvantages. That is, public-key cryptography involves many more steps than does symmetric-key cryptography. This means that public-key cryptography is slow compared to symmetric-key cryptography. Also, a user using the Diffie-Hellman key exchange method cannot be sure that the other user is who they claim to be. Therefore, a need arose for a method of digitally signing an electronic communication.

Taher ElGamal, in a paper entitled "A Public Key Cryptosystem and Signature Scheme Based on Discreet Logarithms," IEEE Transactions on Information Theory, Vol. IT-31, No. 4, July 1985, pp. 469–472, proposed an encryption method and a digital signature method that incorporates the strength of the Diffie Hellman key-exchange method (i.e., the discreet logarithm problem). ElGamal's signature method has received more attention than has his encryption method. ElGamal's signature method is based on Euler's Totient function. In this method, a first user generates a long term secret exponent and "hides" it in a modulo reduced exponentiation using a publicly known base and modulus. The user binds the result to his or her identity by a certifying authority. Next, the first user computes a number using a certain parameter (e.g. a message), his long-term secret, and a second per-message secret. These two secrets are known only by the first user. The first user sends the computed number, the modulo reduced exponentiation of the "per-message secret," and the message to the second user. The second user uses the numbers, the message, and the certified modulo reduced exponentiation to verify a mathematical relationship. If the relationship is verified then the second user is assured that the message came from the first user. This may not be true if the long-term secret is known by an adversary. ElGamal's method creates a digital signature. The computations involved here are mathematically complex and time consuming. The resulting signature is large and requires a large amount of bandwidth in order to transmit it.

In a paper entitled "Efficient Identification and Signatures for Smart Cards," Advances in Cryptology—Proceedings of CRYPTO '89, Lecture Notes in Computer Science, No. 435, Springer-Verlag, New York, 1990, pp. 239–251, Claus Schnorr developed a variation of ElGamal's digital signature that is simpler to compute and takes up less bandwidth than ElGamal's digital signature. Schnorr uses a subgroup of the group used by ElGamal. The subgroup Schnorr uses is smaller than the group used by ElGamal. The result is a faster, less compute intensive method that requires fewer bits to be transmitted. Schnorr's method was patented as U.S. Pat. No. 4,995,082 entitled "METHOD FOR IDENTIFYING SUBSCRIBERS AND FOR GENERATING AND VERIFYING ELECTRONIC SIGNATURES IN A DATA EXCHANGE SYSTEM." U.S. Pat. No. 4,995,082 is hereby incorporated by reference into the specification of the present invention.

The National Institute of Standards and Technology (NIST) published Federal Information Process Standard (FIPS) Publication No. 186 entitled "Digital Signature Standard" (DSS). FIPS PUB 186 is hereby incorporated by reference into the specification of the present invention. The DSS discloses a method of generating a digital signature that is secure, reasonably easy to generate and verify, and bandwidth efficient. U.S. Pat. No. 5,231,668, entitled "Digital Signature Algorithm," (DSA) embodies DSS. U.S. Pat. No. 5,231,668 is hereby incorporated by reference into the specification of the present invention. DSA is a bandwidth efficient variant of ElGamal. DSA employs the computations of ElGamal in a subgroup of the group used by ElGamal. The subgroup used in DSA is smaller than the group used by ElGamal.

In a paper entitled "Message Recovery for Signature Schemes Based on the Discreet Logarithm Problem," Pre-proceedings of Eurocrypt '94, pp. 175–190, Ms. Nyberg and Mr. Rueppel developed a variant of DSA that eliminates the need to send the message while allowing the recovery of the message from what is transmitted. Nyberg and Rueppel also propose a key exchange method that is based on DSA and the Diffie-Hellman key exchange method. The steps of their message-recovery method is as follows:

a) a first user generates two random integers "$k_1$" and "$k_2$," where "$k_1$" and "$k_2$" are each less than a prime integer "q," where "q" divides evenly into "p-1," where "p" is a prime integer greater than "q";

b) the first user computes "$r_1 = g^{(k_2-k_1)} \mod p$," where "^" denotes exponentiation, and where the base "g" has order "q" in the integers modulo "p";

c) the first user computes "$r_2 = r_1 \mod q$";

d) the first user solves the equation "$1 = ((-x_1 * r_2) + (k_1 * s)) \mod q$," for "s", where "$x_1$" is the first user's long-term secret, and where "*" denotes multiplication;

e) the first user transmits ($r_1$, s) to a second user;

f) the second user computes "$r_2 = r_1 \mod q$";

g) the second user computes "$t = (1/s) \mod q$," and "$(((g^{x_1})^{r_2}) * g)^t \mod p$," where this last computation should equal "$g^{k_1} \mod p$";

h) the second user then computes "$(g^{k_2}) * r_1 \mod p$," where the result should equal "$g^{k_2} \mod p$";

i) the second user computes "key = $(g^{k_2})^{x_2} \mod p$," where "$x_2$" is the second user's long-term secret; and j) the second user sends "$g^{x_2} \mod p$" to the first user; and k) the first user computes "key = $((g^{x_2}) \mod p)^{k_2} \mod p$."

Note that the equation in step (d) is the same as the equation in DSA with the value "z" in DSA set to one. The pair "($r_1$, s)" embodies not just the signature of a message, but includes the message itself. The second user recovers the message and verifies the source as the first user. Both users will be able to compute "key" only if they know their respective long term secrets.

The message-recovery method of Nyberg and Rueppel does not allow the recovery of a key by an authorized third party and it requires the transmission of the long value "$r_1$."

In a paper entitled "META-ElGamal Signature Schemes," 2nd ACM Conference on Computer and Communications Security, 1994, Messrs. Horster, Petersen, and Michels disclose a general equation (i.e., $A = (xB + kC) \mod q$) for the three DSS parameters "m", "r", and "s." The parameter "m" denotes the hash of a message to be signed, the signer's long-term secret "x," and the signer's per-signature secret "k." The parameter "r" is computed as "$r = (g^k \mod p) \mod q$." Horster et al. disclose six different signature equations that were generated by six different ways of substituting (m,r,s) for (A,B,C). The six different signature equations are as follows:

$m = x_A r + ks \mod q$, where $A = m$, $B = r$, and $C = s$;

$m = x_A s + kr \mod q$, where $A = m$, $B = s$, and $C = r$;

$s = x_A r + km \mod q$, where $A = s$, $B = r$, and $C = m$;

$s = x_A m + kr \mod q$, where $A = s$, $B = m$, and $C = r$;

$r = x_A s + km \mod q$, where $A = r$, $B = s$, and $C = m$; and $r = x_A m + ks \mod q$, where $A = r$, $B = m$, and C=s.

Horster et al. also disclose a general verification equation (i.e., $\alpha^A = (y_A)^B r^C \mod p$) for the general signature equation. The six different verification equations that correspond to the six signature equations above are as follows:

$\alpha^m = (y_A)^r r^s \mod p$, where $A = m$, $B = r$, and $C = s$;

$\alpha^m = (y_A)^s r^r \mod p$, where $A = m$, $B = s$, and $C = r$;

$\alpha^s = (y_A)^r r^m \mod p$, where $A = s$, $B = r$, and $C = m$;

$\alpha^s = (y_A)^m r^r \mod p$, where $A = s$, $B = m$, and $C = r$;

$\alpha^r = (y_A)^s r^m \mod p$, where $A = r$, $B = s$, and $C = m$; and $\alpha^r = (y_A)^m r^s \mod p$, where $A = r$, $B = m$, and C=s.

The present invention improves upon these general equations by including a method of recovering the key by a third party.

A cryptographic method that allows third party access to an encrypted communication has been proposed. Such a method is called "key escrow." Essentially, key escrow is a cryptographic method that allows a third party (e.g., a law enforcement activity) access to the key used by a first user and a second user when the third party is authorized to do so (e.g., when criminal activity is suspected and a search warrant is obtained). U.S. Pat. Appl. No. 08/528,966, entitled "A DEVICE FOR AND METHOD OF CRYPTOGRAPHY THAT ALLOWS THIRD PARTY ACCESS, now U.S. Pat. No. 5,631,961," is an example of such a method. U.S. Pat. Appl. No. 08/528,966 is hereby incorporated by reference into the specification of the present invention. One of the problems with the proposed key-escrow methods is that the key escrow aspect of the pass or exchange is independent of the key establishment process. This separation makes the method vulnerable to attacks that would not be possible if the key escrow were made an integral part of key establishment process. The present invention discloses a method that allows a first user to pass a cryptographic key to a second user which incorporates a key-escrow feature.

SUMMARY OF THE INVENTION

It is an object of the present invention to pass a cryptographic key from a first user to a second user so that an authorized third party may gain access to the key.

It is another object of the present invention to pass a cryptographic key from a first user to a second user in a certified and bandwidth efficient manner so that an authorized third party may gain access to the key.

It is another object of the present invention to exchange a cryptographic key between a first user and a second user so that an authorized third party may gain access to the key.

It is another object of the present invention to exchange a cryptographic key between a first user and a second user in a certified and bandwidth efficient manner so that an authorized third party may gain access to the key.

The present invention is a method of passing a key between a first user and a second user in a manner that allows an authorized third party to gain access to the key.

In the present invention, key recovery is embedded into the key pass method. Key recovery allows an authorized third party to recover the key with the help of an escrow agent.

The steps of the present invention are as follows:

a) a first user generates a first random number "$k_{1a}$";
b) the first user generates "$key_1 = m(k_{1a})$";
c) the first user generates a second random number "$k_{2a}$";
d) the first user computes "$y_1 = m(h_{p2}(k_{2a}))$";
e) the first user computes "$y_2 = m(H_p(k_{1a}))$;
f) the first user computes "$r_1 = f(y_1, k_{1a})$";
g) the first user computes "$z = f(y_2, key_1)$";
h) the first user computes "$s = (1/k_{2a})\ ((k_{1a}*z) + (x_a*r_1))$ mod q,";
i) the first user computes "$G = g^{k_{1a}}$ mod p";
j) the first user passes $(G, z, r_1, s)$ to the second user;
k) the second user receives "$Y = g^{x_a}$ mod p" from, for example, an independent directory/certificate server;
l) the second user computes "$T = (Y^{r_1} * G^z)^{((1/s)\ \text{mod}\ q)}$ mod p";
m) the second user computes "$y_1 = m(h_{a2}(T))$";
n) the second user computes "$k_{1a} = (f^{-1})\ (y_1, r_1)$,";
o) the second user computes "$key_1 = m(k_{1a})$";
p) a third party intercepts $(G, z, r_1, s)$ transmitted from the first user to the second user;
q) the third party presents "G" and "z" to a key-escrow agent;
r) the key-escrow agent computes "$y_2 = m(H_s(G))$":
s) the key-escrow agent computes "$key_2 = (f^{-1})(y_2, z)$, where $key_2 = key_1$"; and
t) the key escrow agent returns "$key_2$" to the third party if the third party is authorized to receive "$key_2$"; and
u) the third party uses "$key_2$" to decrypt an encrypted message sent between the first user and the second user which was encrypted using "$key_1$."

In an alternate embodiment, steps may be added to the method above that would allow the second user to determine if the first user is complying with escrow aspects of the method. In the method above, the second user is given or computes terms that may be used to generate other terms transmitted from the first user to the second user. The second user may compute certain terms transmitted from the first user to the second user and compare these computed terms to the terms transmitted. The method continues if the compared terms are the same and is halted otherwise. The following five steps may be inserted after step (o) above:

o1) the second user computes "$y_2 = m(H_p(k_{1a}))$";
o2) the second user computes "$z = f(y_2, key)$;
o3) the second user compares "z" computed in step (o2) to "z" received from the first user, if they match, the method continues, otherwise the method is halted;
o4) the second user computes "$G = g^{k_{1a}}$ mod p"; and
o5) the second user compares "G" computed in step (o4) to "G" received from the first user, if they match, the method continues, otherwise the method is halted.

In a second alternate embodiment, "z" may be formed using a portion of "$key_1$" instead of all of "$key_1$". Also, more than one key-escrow agent may be employed, and many different scenarios are possible with respect to what these escrow agents hold. Additional certification and identification schemes may be incorporated into the present invention if desired.

A third alternate embodiment of the present invention is a key exchange method that allows an authorized third party to obtain a key exchanged between a first user and a second user. In the key-exchange method, a first user and a second user each generate and pass their own key as above to the other user. That is, the first user generates a key and passes it to the second user while the second user generates a different key and passes it to the first user. Each user then combines the two keys in an agreed upon fashion to arrive at the final key to be used to encrypt messages between the users. That is, each user combines the key that they generated and passed to the other user to the key that was passed to them by the other user. The authorized third party would then have to intercept the two key messages transmitted between the users, recover both keys, and combine them in the same manner the users did.

The preferred embodiment of the present invention results in a bandwidth efficient method of passing a key from a first user to a second user while allowing an authorized third party access to the key. The present invention is less susceptible to attack than methods that separate key establishment from key escrow.

BRIEF DESCRIPTION OF THE DRAWINGS

FIG. 3 lists the improved generalized equations for a signature and verification of the signature and six possible variations of these equations.

DETAILED DESCRIPTION

Figure 1:
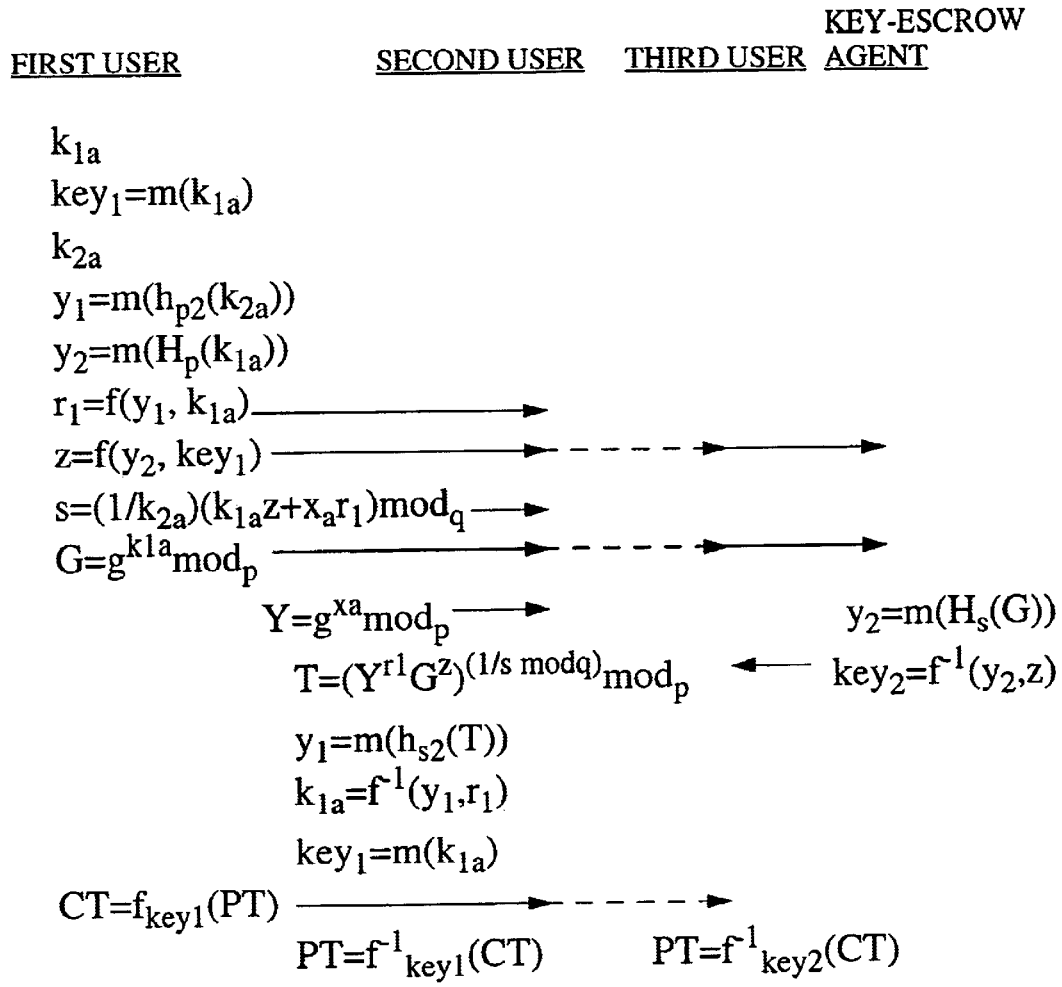
FIG. 1 is a list of the steps of the preferred embodiment of the present invention.

The present invention is a method of passing a key between a first user and a second user in a manner that allows an authorized third party to gain access to the key. A "key pass" is defined as a method of passing a key created by a first user to a second user. A "key exchange" is defined as a method of establishing a key between a first user and a second user in a manner where both users participate in the creation of the key.

In the present invention, a key recovery access field is embedded into the key pass method. The access field is embedded into a parameter "z." The access field allows an authorized third party to recover the key with the help of an escrow agent.

Six functions are required by the present invention (i.e., "$h_{p2}$"; "$h_{s2}$"; "$H_p$"; "$H_s$"; "f"; and "m"). The first user and the second user also share a prime modulus "p" and a base element "g," where the order of "g mod p" is a prime number "q."

The functions "$h_{p2}$" and "$h_{s2}$" are the public and secret functions, respectively, of the second user's public-key encryption function. These functions are related as follows: "$h_{p2}(k_{2a}) = h_{s2}(g^{k_{2a}}\ \text{mod}\ p)$," where "$k_{2a}$" is the second random number of the first user.

The functions "$H_p$" and "$H_s$" are the public and secret function, respectively, of the key escrow agent's public-key encryption function. Note that one or more key-escrow agents may be employed to each hold the same item or to each hold a portion of an item. These functions are related as follows:
"$H_p(k_{1a}) = H_s(g^{k_{1a}}\ \text{mod}\ p)$," where "$k_{1a}$" is the first random number of the first user.

The function "f" is be a secure encryption function (e.g., the Digital Encryption Standard (DES)) where the first input is a cryptographic key, where the second input is a message to be encrypted, and where the output is the encrypted message. DES is disclosed in Federal Information Process Standard Publication No. 81 (i.e., FIPS PUB 81). FIPS PUB 81 is hereby incorporated by reference into the specification of the present invention. The inverse of encryption is decryption. Therefore, if the function "f" is an encryptor then the function "f$^{-1}$" denotes a decryptor that may be used to decrypt a message encrypted by the function "f."

The function "m" is a hard-to-invert hashing function (i.e., a function that maps a value to a smaller value). The function "m" outputs a bit string of length "t," where "t" is equal to the number of bits in the cryptographic key of the encryption function "f." It is preferred that some appropriately truncated output of the Secure Hash Algorithm (SHA) disclosed in Federal Process Standard Publication No. 180 (i.e., FIPS PUB 180) be used for the function "m." FIPS PUB 180 is hereby incorporated by reference into the specification of the present invention. SHA outputs 160 bits. If DES is used as the encryption function "f" then a 56-bit key is required. If SHA is used as the function "m" then the function "m" must map the 160-bit output string of SHA to a 56-bit string. It is preferred that the function "m" output the middle 56 bits of the 160-bit SHA output as the DES key.

Given these functions and using the notation and parameters as in DSA, a bandwidth-efficient, self-certifying, DSA compatible, key pass method that allows an authorized third party access to the key is listed in FIG. 1 and is as follows:

a) a first user generates a first random number "$k_{1a}$," where "$k_{1a}$" is a non-zero member of the group "$Z_q$";

b) the first user generates "$key_1 = m(k_{1a})$";

c) the first user generates a second random number "$k_{2a}$," where "$k_{2a}$" is a non-zero member of the group "$Z_q$";

d) the first user computes "$y_1 = m(h_{p2}(k_{2a}))$";

e) the first user computes "$y^2 = m(H_p(k_{1a}))$";

f) the first user computes "$r_1 = f(y_1, k_{1a})$";

g) the first user computes "$z = f(y_2, key_1)$";

h) the first user computes "$s = (1/k_{2a})((k_{1a}*z)+(x_a*r_1))$ mod q," where "$x_a$" is the first user's long-term secret;

i) the first user computes "$G = g^{k_{1a}}$ mod p";

j) the first user passes $(G, z, r_1, s)$ to the second user;

k) the second user receives "$y = g^{x_a}$ mod p" from, for example, a directory/certificate server;

l) the second user computes "$T = (Y^{r_1} * G^z)^{((1/s) \mod q)}$ mod p";

m) the second user computes, "$y_1 = m(h_{s2}(T))$";

n) the second user computes "$k_{1a} = (f^{-1})(y_1, r_1)$";

o) the second user computes "$key_1 = m(k_{1a})$";

p) a third party intercepts $(G, z, r_1, s)$ transmitted from the first user to the second user;

q) the third party presents "G" and "z" to a key-escrow agent;

r) the key-escrow agent computes "$y_2 = m(H_s(G))$":

s) the key-escrow agent computes "$key_2 = (f^{-1})(y_2, z)$, where $key_2 = key_1$"; the t) the key escrow agent returns "$key_2$"; to the third party if the third party is authorized to receive "$key_2$"; and u) the third party uses "$key_2$" to decrypt an encrypted message sent between the first user and the second user which was encrypted using "$key_1$."

Figure 2:
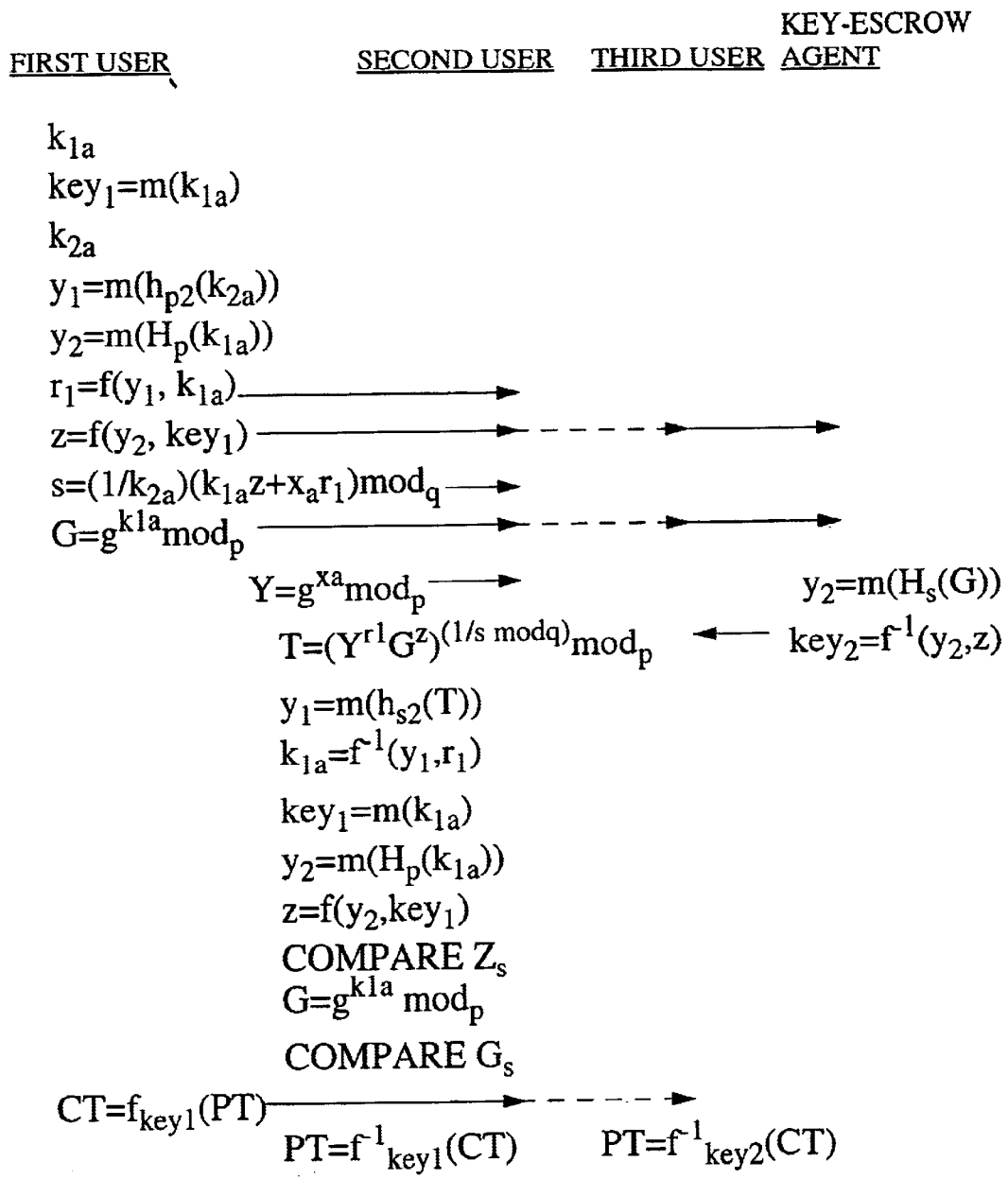
FIG. 2 is a list of the steps of the first alternate embodiment of the present invention.

In an alternate embodiment, steps may be added to the method above that would allow the second user to determine if the first user is complying with the escrow aspects of the method. In the method above, the second user is given or computes terms that may be used to compute other terms that the first user transmitted to the second user. The second user may compute certain terms transmitted from the first user to the second user and compare them to the terms actually transmitted. The method continues if the compared terms are the same and is halted otherwise. FIG. 2 lists the steps of the alternate embodiment. Essentially, the following five steps are inserted after step (o) of the preferred embodiment above:

o1) the second user computes "$y_2 = m(H_p(k_{1a}))$";

o2) the second user computes "$z = f(y_2, key_1)$;

o3) the second user compares "z" computed in step (o2) to "z" received from the first user, if they match, the method continues, otherwise the method is halted;

o4) the second user computes "$G = g^{k_{1a}}$, mod p"; and o5) the second user compares "G" computed in step (o4) to "G" received from the first user, if they match, the method continues, otherwise the method is halted.

In a second alternate embodiment, "z" may be formed using a portion of "$key_1$" instead of all of "$key_1$". Any parameter based on "z" would change accordingly. In this case, the authorized third party would recover this portion of "$key_1$" and not all of "$key_1$." Also, more than one key-escrow agent may be employed, and many different scenarios are possible with respect to what these escrow agents hold. For example, one or more key-escrow agents may return all or a portion of "$key_1$" to the third party. Additional certification and identification schemes may be incorporated into the present invention if desired.

A third alternate embodiment of the present invention is a key exchange method that allows an authorized third party to obtain a key exchanged between a first user and a second user. In the key-exchange method, a first user and a second user each generate and pass their own key as above to the other user. That is, the first user generates a key and passes it to the second user while the second user generates a different key and passes it to the first user. Each user then combines the two keys in an agreed upon fashion to arrive at the final key to be used to encrypt messages between the users. That is, each user combines the key that they generated and passed to the other user to the key that was passed to them by the other user. The authorized third party would then have to intercept the two key messages transmitted between the users, recover both keys, and combine them in the same manner as the users did.

Other embodiments of the present invention may be realized by generating every permutation of the parameters of the present invention ($\pm s, \pm z, \pm r,$) for the parameters (A, B, C) in the following improved generalized equations for a DSS signature and verification of a DSS signature as "$k_{2a}A = (x_aB + k_{1a}C) \mod q$" and "$T = (Y^B G^C)^{(1/A \mod q)} \mod p$," respectively. The signature equation (i.e., the first of the two equations shown immediately above) is solved for the signature parameter "s." In the preferred embodiment $A=s$, $B=r_1$, and $C=z$. Six signature and verification equations using just the positive parameters $(z, s, r_1)$ are as follows:

$$s = (k_{1a})(k_{2a}z - x_a r_1) \mod q, \ T = ((Y^{r_1})(G^s))^{(1/z \mod q)} \mod p, \text{ where } A=z, B=r_1, \text{ and } C=s;$$

$$s = (1/x_a)(k_{2a}z - k_{1a}r_1) \mod q, \ T = ((Y^s)(G^{r_1}))^{(1/z \mod q)} \mod p, \text{ where } A=z, B=s, \text{ and } C=r_1;$$

$$s = (1/k_{2a})(x_a r_1 + k_{1a}z) \mod q, \ T = ((Y^{r_1})(G^z))^{(1/s \mod q)} \mod p, \text{ where } A=s,$$

$B=r_1$, and $C=z$ (the preferred embodiment);

$s=(1/k_{2a})(x_a z+k_{1a}r_1)$ mod $q$, $T=((Y^z)$ $(G^{r_1}))^{(1/s \bmod q)}$ mod $p$, where $A=s$, $B=z$, and $C=r_1$;

$s=(1/x_a)(k_{2a}r_1-k_{1a}z)$ mod $q$, $T=((Y^s)($ $G^z))\hat{\ }(1/r_1$ mod $q)$ mod $p$, where $A=r_1$, $B=s$, and $C=z$; and $s=(1/k_{1a})(k_{2a}r_1-x_a z)$ mod $q$, $T=((Y^z)($ $G^s))\hat{\ }(1/r_1$ mod $q)$ mod $p$, where $A=r_1$, $B=z$, and $C=s$.

The preferred embodiment of the present invention results in a bandwidth efficient method of passing a key from a first user to a second user while allowing an authorized third party access to the key. The present invention is less susceptible to attack than methods that separate key establishment from key escrow. Also, by incorporating DSA into the present invention, a self-certification feature is obtained.

What is claimed is:

1. A method of passing a cryptographic key that allows recover of the key by a third party, comprising the steps of:
   a) generating a first random number "$k_{1a}$" by a first user, where "$k_{1a}$" is a non-zero member of a group "$Z_q$" and where "q" is a prime number;
   b) generating "key$_1$=m($k_{1a}$)" by the first user, where "m" is a hashing function;
   c) generating a second random number "$k_{2a}$" by the first user, where "$k_{2a}$" is a non-zero member of the group "$Z_q$";
   d) computing "$y_1$=m($h_{p2}(k_{2a})$)" by the first user, where "$h_{p2}$" is a public function of a public-key encryption function of a second user;
   e) computing "$y_2$=m($H_p(k_{1a})$)" by the first user, where "$H_p$" is a public function of a public-key encryption function of a key escrow agent;
   f) computing "$r_1$=f($y_1,k_{1a}$)" by the first user, where "f" is a secure encryption function;
   g) computing "z=f($y_2$, key$_1$)" by the first user;
   h) computing a signature, by the first user, by computing "A=(1/$k_{2a}$)($x_a B+k_{1a}C$)mod q," where "z", "$r_1$", and "s" are substituted for "A", "B", and "C," where the equation for computing a signature is solved for "s," and where "$x_a$" is a long-term secret of the first user;
   i) computing "G=g$\hat{\ }k_{1a}$ mod p" by the first user;
   j) passing (G,z,$r_1$,s) from the first user to the second user;
   k) receiving "Y=g$\hat{\ }x_a$ mod p" by the second user, where "g" is a base element, and where "p" is a prime integer;
   l) verifying the computed signature, by the second user, by computing "T=($Y^B*G^C$)$^{((1/A) \bmod q)}$ mod p," where "z", "$r_1$", and "s" are substituted for "A", "B", and "C";
   m) computing "$y_1$=m($h_{s2}(T)$)" by the second user, where "$h_{s2}$" is a secret function of the public-key encryption function of the second user;
   n) computing "$k_{1a}$=(f$^{-1}$)($y_1,r_1$)" by the second user;
   o) computing "key$_1$=m($k_{1a}$)" by the second user;
   p) intercepting, by a third party, (G,z,$r_1$,s) transmitted from the first user to the second user;
   q) presenting "G" and "z," by the third party, to a key-escrow agent;
   r) computing "$y_2$=m($H_s(G)$)" by the key-escrow agent, where "$H_s$" is a secret function of the public-key encryption function of the key-escrow agent;
   s) computing "key$_2$=(f$^{-1}$)($y_2$, z)" by the key-escrow agent, where key$_2$=key$_1$;
   t) returning "key$_2$" from the key-escrow agent to the third party if the third party is authorized to receive "key$_2$"; and
   u) using "key$_2$," by the authorized third party, to decrypt an encrypted message sent between the first user and the second user which was encrypted using "key$_1$".

2. The method of claim 1, wherein the step of computing a signature by computing "A=(1/$k_{2a}$) ($x_a B+k_{1a}C$)mod q" is realized by computing "A=(1/$k_{2a}$) ($x_a B+k_{1a}C$) mod q," where A=s, B=$r_1$, and C=z, and solving for "s" such that "s=(1/$k_{2a}$) (($x_a*r_1$)+($k_{1a}*z$)) mod q."

3. The method of claim 2, wherein the step of verifying the signature "A" by computing "T=($Y^B*G^C$)$^{((1/A \bmod q)}$ mod p" is realized by computing "T=($Y^B*G^C$)$^{((1/A) \bmod q)}$ mod p," where A=s, B=$r_1$, and C=z such that "T=($Y\hat{\ }r_1*G\hat{\ }z$)$\hat{\ }$((1/s) mod q) mod p."

4. The method of claim 1, wherein the step of computing a signature by computing "A=(1/$k_{2a}$) ($x_a B+k_{1a}C$) mod q" is realized by computing "A=(1/$k_{2a}$) ($x_a B+k_{1a}C$) mod q," where A=z, B=$r_1$, and C=s, and solving for "s" such that "s=(1/$k_{1a}$) ($k_{2a}z-x_a r_1$) mod q."

5. The method of claim 4, wherein the step of verifying the signature "A" by computing "T=($Y^B*G^C$)$^{((1/A) \bmod q)}$ mod p" is realized by computing "T=($Y^B*G^C$)$^{((1/A) \bmod q)}$ mod p," where A=z, B=$r_1$, and C=s such that "T=($Y\hat{\ }r_1*G\hat{\ }s$)$\hat{\ }$ ((1/z) mod q) mod p."

6. The method of claim 1, wherein the step of computing a signature by computing "A=(1/$k_{2a}$) ($x_a B+k_{1a}C$) mod q" is realized by computing "A=(1/$k_{2a}$) ($x_a B+k_{1a}C$)mod q," where A=z, B=s, and C=$r_1$, and solving for "s" such that "s=(1/$x_a$) ($k_{2a}z-k_{1a}r_1$) mod q."

7. The method of claim 6, wherein the step of verifying the signature "A" by computing "T=($Y^B*G^C$)$^{((1/A) \bmod q)}$ mod p" is realized by computing "T=($Y^B*G^C$)$^{((1/A) \bmod q)}$ mod p," where A=z, B=s, and C=$r_1$ such that "T= ($Y\hat{\ }s*G\hat{\ }r_1$)$\hat{\ }$ ((1/z) mod q) mod p."

8. The method of claim 1, wherein the step of computing a signature by computing "A=(1/$k_{2a}$) ($x_a B+k_{1a}C$) mod q" is realized by computing "A=(1/$k_{2a}$) ($x_a B+k_{1a}C$)mod q," where A=s, B=z, and C=$r_1$, and solving for "s" such that "s=(1/$k_{2a}$) ($x_a z+k_{1a}r_1$) mod q."

9. The method of claim 8, wherein the step of verifying the signature "A" by computing "T=($Y^B*G^C$)$^{((1/A) \bmod q)}$ mod p" is realized by computing "T=($Y^B*G^C$)$^{((1/A) \bmod q)}$ mod p," where A=s, B=z, and C=$r_1$ such that "T=($Y\hat{\ }z*G\hat{\ }r_1$)$\hat{\ }$((1/s) mod q) mod p."

10. The method of claim 1, wherein the step of computing a signature by computing "A=(1/$k_{2a}$) ($x_a B+k_{1a}C$)mod q" is realized by computing "A=(1/$k_{2a}$) ($x_a B+k_{1a}C$) mod q," where A=$r_1$, B=s, and C=z, and solving for "s" such that "s=(1/$x_a$) ($k_{2a}r_1-k_{1a}z$) mod q."

11. The method of claim 10, wherein the step of verifying the signature "A" by computing "T=($Y^B*G^C$)$^{((1/A) \bmod q)}$ mod p" is realized by computing "T=($Y^B*G^C$)$^{((1/A) \bmod q)}$ mod p," where A=$r_1$, B=s, and C=z such that "T=($Y\hat{\ }s*G\hat{\ }z$)$\hat{\ }$( (1/$r_1$) mod q) mod p."

12. The method of claim 1, wherein the step of computing a signature by computing "A=(1/$k_{2a}$) ($x_a B+k_{1a}C$) mod q" is realized by computing "A=(1/$k_{2a}$) ($x_a B+k_{1a}C$) mod q," where A=$r_1$, B=z, and C=s, and solving for "s" such that "s=(1/$k_{1a}$) ($k_{2a}r_1-x_a z$) mod q."

13. The method of claim 12, wherein the step of verifying the signature "A" by computing "T=($Y^B*G^C$)$^{((1/A) \bmod q)}$ mod p" is realized by computing "$T=(Y^B*G^C)^{((1/A) \bmod q)} \bmod p$," where $A=r_1$, $B=z$, and $C=s$ such that "$T=(Y\char`\^z*G\char`\^s)\char`\^((1/r_1) \bmod q) \bmod p$."

14. The method of claim 1, wherein the function "m" used in steps (b), (d), (e), (m), (o), and (r) is comprised of the steps of a Secure Hash Algorithm as disclosed in FIPS PUB 180.

15. The method of claim 1, wherein the function "f" used in steps (f), (g), (n), and (s) is comprised of the steps of a Digital Encryption Standard as disclosed in FIPS PUB 81.

16. The method of claim 1, further including the following steps:
   a) computing "$y_2=m(H_p(k_{1a}))$" by the second user;
   b) computing "$z=f(y_2, key_1)$" by the second user;
   c) comparing, by the second user, "z" received from the first user to "z" computed by the second user, if they match the method continues, otherwise the method is halted;
   d) computing "$G=g\char`\^k_{1a} \bmod p$" by the second user; and
   e) comparing, by the second user, "G" received from the first user to "G" computed by the second user, if they match the method continues, otherwise the method is halted.

17. The method of claim 3, wherein the function "m" used in steps (b), (d), (e), (m), (o), and (r) is comprised of the steps of a Secure Hash Algorithm as disclosed in FIPS PUB 180.

18. The method of claim 17, wherein the function "f" used in steps (f), (g), (n), and (s) is comprised of the steps of a Digital Encryption Standard as disclosed in FIPS PUB 81.

19. The method of claim 18, further including the following steps:
   a) computing "$y_2=m(H_p(k_{1a}))$" by the second user;
   b) computing "$z=f(y_2, key_1)$" by the second user;
   c) comparing, by the second user, "z" received from the first user to "z" computed by the second user, if they match the method continues, otherwise the method is halted;
   d) computing "$G=g\char`\^k_{1a} \bmod p$" by the second user; and
   e) comparing, by the second user, "G" received from the first user to "G" computed by the second user, if they match the method continues, otherwise the method is halted.

\* \* \* \* \*